United States Patent [19]

Krause

[11] Patent Number: 5,565,922

[45] Date of Patent: Oct. 15, 1996

[54] MOTION COMPENSATION FOR INTERLACED DIGITAL VIDEO SIGNALS

[75] Inventor: Edward A. Krause, San Diego, Calif.

[73] Assignee: General Instrument Corporation of Delaware, Chicago, Ill.

[21] Appl. No.: 590,867

[22] Filed: Jan. 24, 1996

Related U.S. Application Data

[63] Continuation of Ser. No. 225,533, Apr. 11, 1994, abandoned.

[51] Int. Cl.[6] ........................................ H04N 7/32
[52] U.S. Cl. ........................ 348/413; 348/699; 348/416
[58] Field of Search ............................... 348/699, 700, 348/701, 384, 390, 402, 413, 416, 409, 415, 400, 401

[56] References Cited

U.S. PATENT DOCUMENTS

| | | | |
|---|---|---|---|
| 5,036,393 | 7/1991 | Samad et al. | 348/416 |
| 5,068,724 | 11/1991 | Krause et al. | 348/402 |
| 5,091,782 | 2/1992 | Krause et al. | 348/400 |
| 5,093,720 | 3/1992 | Krause et al. | 348/452 |
| 5,193,004 | 3/1993 | Wang et al. | 348/413 |
| 5,394,190 | 2/1995 | Yamada | 348/413 |
| 5,412,430 | 5/1995 | Nagata | 348/413 |

OTHER PUBLICATIONS

"Coded Representation of Picture and Audio Information—Test Model 5," International Organisation for Standardisation Document AVC–491, Version 1, Apr. 1993.

Primary Examiner—Thai Q. Tran
Assistant Examiner—A. Au
Attorney, Agent, or Firm—Barry R. Lipsitz; Ralph F. Hoppin

[57] ABSTRACT

A method and apparatus are provided for motion compensated coding of interlaced digital video signals. A first prediction error signal is obtained indicative of the difference between a current portion from a field of a current video frame and a similarly situated first portion in the same field of a prior video frame. A second prediction error signal is obtained indicative of the difference between the current portion and a similarly situated second portion in an opposite field of the prior video frame. A third prediction error signal is obtained indicative of the difference between the current portion and an average of the first and second portions. One of the first, second and third prediction error signals is selected to represent the current portion. Motion vector information is provided to enable the current frame portion to which the selected prediction error signal corresponds to be reproduced by a decoder.

39 Claims, 5 Drawing Sheets

MOTION COMPENSATION FOR INTERLACED DIGITAL VIDEO SIGNALS

This application is a continuation of commonly assigned, U.S. patent application Ser. No. 08/225,533 filed Apr. 11, 1994, now abandoned.

BACKGROUND OF THE INVENTION

The present invention relates to the compression of digital data, and more particularly to a method and apparatus for providing motion compensation for an interlaced digital video signal, such as a television signal.

Digital transmission of television signals can deliver video and audio services of much higher quality than previous analog techniques. Digital transmission schemes are particularly advantageous for signals that are broadcast by satellite to cable television affiliates and/or directly to home satellite television receivers. Such signals can also be transmitted via a cable television network.

A substantial amount of digital data must be transmitted in any digital television system. This is particularly true where high definition television ("HDTV") is provided. In a digital television system, a subscriber receives the digital data stream via a receiver/descrambler that provides video, audio and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data bits referred to as "pixels." A large amount of data is required to define each video frame of a television signal. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spacial correlation, but can also utilize similarities among adjacent frames to further compact the data. In such systems, differential encoding is used to transmit only the difference between an actual frame and a prediction of the actual frame. The prediction is based on information derived from a previous frame of the same video sequence. Examples of such systems can be found in Krause et al. U.S. Pat. Nos. 5,068,724; 5,091,782; and 5,093,720 which relate to various motion compensation schemes for digital video.

In motion compensation systems of the type disclosed in the referenced patents, motion vectors are derived by comparing a portion (i.e., block) of pixel data from a field of a current frame to similar portions of the previous frame. A motion estimator determines how the corresponding motion vector in the previous frame should be adjusted in order to be used in the current field. Such systems are very effective in reducing the amount of data to be transmitted, particularly when the source video is in a progressive scan format. However, when applied to interlaced video in which the odd and even numbered lines of a picture are transmitted consecutively as two separate interleaved fields, the efficiency of existing motion compensation techniques is sufficiently reduced.

It would be advantageous to provide a motion compensation system for interlaced digital video signals in which a greater degree of data compression can be achieved. The present invention provides such a system.

SUMMARY OF THE INVENTION

In accordance with the present invention, a method for motion compensated coding of digital video signals is provided. The digital video signals define successive frames of interlaced video data. A first prediction error signal indicative of the difference between a current portion from a field of a current video frame and a similarly situated first portion in the same field of a prior video frame is obtained. A second prediction error signal indicative of the difference between the current portion and a similarly situated portion in an opposite field of the prior video frame is obtained. A third prediction error signal is obtained which is indicative of the difference between the current portion and an average of the first and second portions. One of the first, second and third prediction error signals is selected to represent the current portion.

Motion vector information can be provided to enable the current frame portion to which the selected prediction error signal corresponds to be reproduced by a decoder. In a practical system, the first, second and third prediction error signals are obtained for each of a plurality of portions in the current video frame. In order to do this, an odd field of the current video frame is subdivided into portions of odd field pixel data. The even field of the current video frame is subdivided into portions of even field pixel data. Each portion of pixel data from the current video frame is compared to similarly situated portions in both the odd and even fields of the prior video frame to find a preferred prior frame same field counterpart F and a preferred prior frame opposite field counterpart G for each current frame portion. The first prediction error signal for each current frame portion is indicative of the difference between the portion and its F counterpart. The second prediction error signal for each current frame portion is indicative of the difference between the portion and its G counterpart. The third prediction error signal for each current frame portion is indicative of the difference between the portion and the average of its F and G counterparts.

The selected prediction error signal for each current frame portion can be encoded with data indicative of the location in the prior video frame of the F counterpart when the first prediction error signal is selected. When the second prediction error signal is selected, the selected prediction error signal is encoded with data indicative of the location in the prior video frame of the G counterpart. When the third prediction error signal is selected, it is encoded with data indicative of the location in the prior video frame of both the F and G counterparts. The encoding data can comprise field identifier information and motion vectors.

In a somewhat different, "frame mode" implementation, the first, second and third prediction error signals are obtained for each of a plurality of portions in the current video frame defined by block pairs having both odd and even field pixel data. Specifically, the current video frame is subdivided into block pairs of odd and even field pixel data. The odd and even field pixel data of each block pair from the current video frame is compared to similarly situated odd and even field pixel data, respectively, in the prior video frame to find a preferred prior frame same field counterpart F for each current frame block pair. The odd and even field pixel data of each block pair from the current video frame is also compared to similarly situated even and odd field pixel data, respectively, in the prior video frame to find a preferred prior frame opposite field counterpart G for each current frame block pair. The first prediction error signal for each current frame block pair is indicative of the difference between the block pair and its F counterpart. The second prediction error signal for each current frame block pair is indicative of the difference between the block pair and its G counterpart. The third prediction error signal for each current frame block pair is indicative of the difference between the block and the average of the F and G counterparts for that block pair.

The selected prediction error signal for each current frame block pair is encoded with data indicative of the location in the prior video frame of the F counterpart when the first prediction error signal is selected, of the G counterpart when the second prediction error signal is selected, and of both the F and G counterparts when the third prediction error signal is selected. The encoding data comprises field identifier information and motion vectors.

A method for motion compensated coding of interlaced frames of digital video data is also provided in which both field mode and frame mode processing is compared. A current video frame is subdivided into block pairs of odd and even field pixel data. The odd and even field pixel data of each block pair from the current video frame is compared to similarly situated odd and even field pixel data, respectively, in the prior video frame to find a preferred prior frame same field counterpart F for each current frame block pair, the difference between the current frame block pair and its F counterpart comprising a first frame mode prediction error signal. The odd and even field pixel data of each block pair from the current video frame is compared to similarly situated even and odd field pixel data, respectively, in the prior video frame to find a preferred prior frame opposite field counterpart G for each current frame block pair, the difference between the current frame block pair and its G counterpart comprising a second frame mode prediction error signal. The pixel data of each block pair is compared to the average of the F and G counterparts for that block pair, the difference comprising a third frame mode prediction error signal. One of the first, second and third frame mode prediction error signals is selected as a preferred frame mode prediction error signal. The odd field pixel data of each current frame block pair is compared to similarly situated odd field pixel data in the prior video frame to find a preferred prior frame same field counterpart F1 for the current frame block pair odd field pixel data. The difference between the current frame block pair odd field pixel data and its F1 counterpart comprises a first field mode prediction error signal. The odd field pixel data of each current frame block pair is compared to similarly situated even field pixel data in said prior video frame to find a preferred prior frame opposite field counterpart G1 for the current frame block pair odd field pixel data. The difference between the current frame block pair odd field pixel data and its G1 counterpart comprises a second field mode prediction error signal. The even field pixel data of each current frame block pair is compared to similarly situated even field pixel data in the prior video frame to find a preferred prior frame same field counterpart F2 for the current frame block pair even field pixel data. The difference between the current frame block pair even field pixel data and its F2 counterpart comprises a third field mode prediction error signal. The even field pixel data of each current frame block pair is compared to similarly situated odd field pixel data in the prior video frame to find a preferred prior frame opposite field counterpart G2 for the current frame block pair even field pixel data. The difference between the current frame block pair even field pixel data and its G2 counterpart comprises a fourth field mode prediction error signal.

The odd field pixel data of each current frame block pair is compared to the average of the F1 and G1 counterparts to obtain a fifth field mode prediction error signal. The even field pixel data of each current frame block pair is compared to the average of the F2 and G2 counterparts to obtain a sixth field mode prediction error signal.

One of the first, second and fifth field mode prediction error signals is selected as a preferred odd field mode prediction error signal. One of the third, fourth and sixth field mode prediction error signals is selected as a preferred even field mode prediction error signal. Either the preferred frame mode prediction error signal or the preferred odd and even field mode prediction error signals are selected to represent a current block pair.

Motion vector information is provided to enable the current block pair to be reconstructed at a decoder. The motion vector information includes at least one of an F and G motion vector when the preferred frame mode prediction error signal is selected to represent the current block pair. When the preferred odd and even field mode prediction error signals are selected to represent the current block pair, at least one of an F1 and G1 motion vector and at least one of an F2 and G2 motion vector is included in the motion vector information. In a preferred embodiment, the G, G1 and G2 motion vectors correspond to the G, G1 and G2 opposite field counterparts, respectively, and are scaled to account for a difference in distance resulting from the use of an opposite field block comparison instead of a same field block comparison. Each of the F, F1 and F2 motion vectors and the scaled G, G1 and G2 motion vectors included in the motion vector information for a current block pair is differentially encoded with a corresponding previous motion vector for transmission with the current block pair.

The selection of the prediction error signal to use for each block pair can be made based on the choice that would minimize the data necessary for transmission to enable a decoder to reproduce the current block pair. The F and G counterpart can be found by minimizing the sum of the magnitude of odd and even field errors between the current frame block pair and the similarly situated pixel data in the prior video frame.

In a more general embodiment, a method is provided for motion compensated coding of interlaced frames of digital video data. A current video frame is subdivided into block pairs, each block pair comprising an odd field pixel data block and an even field pixel data block. The block pairs of the current video frame are compared to similarly situated block pairs of a prior video frame using frame processing to obtain, for each current block pair, a preferred frame mode prediction error signal based on a consideration of same field block pair comparisons, opposite field block pair comparisons and an average of the same and opposite field block pair comparisons. The odd and even field pixel data blocks forming the block pairs of the current video frame are compared to similarly situated blocks of the prior video frame using field processing to obtain, for each of the odd and even field pixel data blocks, a preferred field mode prediction error signal based on a consideration of the same field block comparisons, opposite field block comparisons, and an average of the same and opposite field block comparisons. For each current block pair, either the preferred frame mode prediction error signal or the preferred odd and even mode prediction error signals associated with that block pair are selected.

Encoder apparatus is provided in accordance with the invention for motion compensated coding of interlaced digital video signals, in which successive interlaced fields of odd and even pixel data form successive video frames. Means are provided for subdividing the frames into block pairs, each containing a block of odd field pixel data and a block of even field pixel data. Means are provided for storing the blocks from at least three successive fields for use in generating prediction error signals indicative of the difference between the odd and even blocks of each block pair of a current frame and similarly situated same field and opposite field prediction data in a prior frame. Means are provided for choosing a preferred field mode prediction error signal for each block of the current frame block pairs from a same field prediction error, an opposite field prediction error, and a prediction error based on an average of the same field and opposite field prediction data for the block. A preferred frame mode prediction error signal is chosen for each block pair of the current frame from a same field prediction error, an opposite field prediction error, and a prediction error based on an average of the same field and opposite field prediction data for the block pair. Means are provided for selecting either the preferred field mode prediction error signals or the preferred frame mode prediction error signal to represent the corresponding block pair.

The encoder apparatus can include means for providing a motion vector for each of the odd and even block same field and opposite field prediction errors and for each of the block pair same field and opposite field prediction errors. Means are provided for outputting the motion vector(s) corresponding to the prediction error signal(s) selected by the selecting means. Means are also provided in the encoder apparatus for scaling the motion vectors associated with the opposite field prediction errors to account for a difference in distance resulting from the use of an opposite field block comparison instead of a same field block comparison. Means are provided for differentially encoding successive motion vectors with immediately preceding motion vectors for successive prediction error signals selected by the selecting means.

The means for choosing preferred field mode and frame mode prediction error signals within the encoder apparatus can comprise first and second motion estimator means. The first motion estimator means are coupled to receive current frame even blocks for comparison with similarly situated prior even field blocks and coupled to receive current frame odd blocks for comparison with similarly situated prior even field blocks. The first motion estimator outputs even block same field predictions F2 and motion vectors $F2_v$ for each current frame even block, and outputs odd block opposite field predictions G1 and motion vectors $G1_v$ for each current frame odd block. The second motion estimator is coupled to receive current frame odd blocks for comparison with similarly situated prior odd field blocks and coupled to receive current frame even blocks for comparison with similarly situated prior odd field blocks. The second motion estimator outputs odd block same field predictions F1 and motion vectors $F1_v$ for each current frame odd block and even block opposite field predictions G2 and motion vectors $G2_v$ for each current frame even block. Means are provided for testing each of the F1, F2, G1, and G2 predictions for each current frame block against a criteria to obtain the field mode same field prediction error and field mode opposite field prediction error for each block. Means are provided for averaging the prior odd and even field blocks, respectively, used to obtain the F1 and F2 predictions to provide F predictions for the block pairs and for averaging the prior even and odd field blocks, respectively, used to obtain the G1 and G2 predictions to provide G predictions for the block pairs. The F and G predictions are averaged to provide F/G prediction errors for the block pairs. Means are provided for testing each of the F, G and F/G predictions for each current frame block pair against a criteria to obtain said frame mode same field prediction error, said frame mode opposite field prediction error, and said average based prediction error for each block pair.

The encoder apparatus can further include means for scaling the $G1_v$ and $G2_v$ motion vectors to account for a difference in distance resulting from the use of an opposite field block comparison instead of a same field block comparison when obtaining the opposite field predictions G1, G2 and G.

Decoder apparatus in accordance with the invention decodes motion compensated interlaced digital video signals. Memory means store odd and even field pixel data for a first video frame. Means are provided for receiving motion compensated pixel data from odd and even field portions of a second video frame together with motion vector and motion compensation mode information for said portions. The motion vector information identifies pixel data in the same and/or opposite field of the stored first video frame that is necessary to reconstruct the second video frame from the received motion compensated pixel data. First motion compensator means are responsive to received same field motion vector information for retrieving pixel data from the same field of the stored first video frame as a portion of the second video frame being processed. Second motion compensator means are responsive to received opposite field motion vector information for retrieving pixel data from the opposite field of the first video frame than the portion of the second video frame being processed. Means responsive to the motion compensation mode information are provided for combining the received motion compensated pixel data with pixel data retrieved by the first motion compensator means, with pixel data retrieved by the second motion compensator means, or with an average of the pixel data retrieved by both of the first and second motion compensator means. The combined data is used to reconstruct the second video frame.

DETAILED DESCRIPTION OF THE PREFERRED EMBODIMENTS

Figure 1:
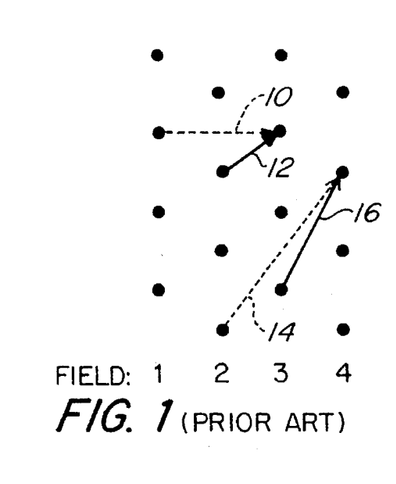
FIG. 1 is a diagrammatic illustration of a prior art field mode motion prediction scheme.

In the past, motion compensation for interlaced video signals has been applied using either field mode motion prediction or frame mode motion prediction. One form of field mode motion prediction is illustrated in FIG. 1. In this prior art technique, previous fields one and two are used to predict the video content of current fields three and four. The prediction for field three is derived from either field one, as indicated by vector 10, or field two, as indicated by vector 12. Similarly, the prediction for field four is derived from either field two as indicated by vector 14 or from field three as indicated by vector 16. Since a vertical offset exists between the lines of adjacent fields due to the inherent nature of interlaced video, it is advantageous to consider both of the two most recent fields when predicting a new, current field. The most recent field that provides the most accurate prediction of the current field is the one that is selected to provide a prediction error signal for transmission.

Figure 2:
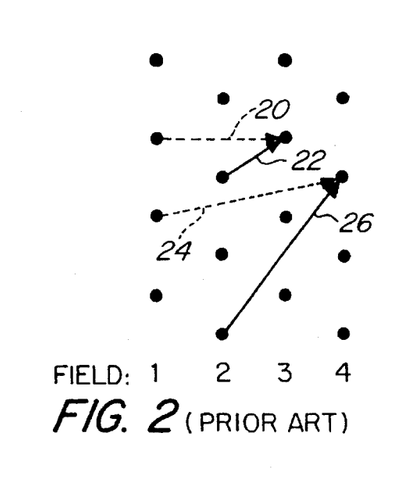
FIG. 2 is a diagrammatic illustration of an alternate prior art field mode motion prediction scheme.

A second form of prior art field mode motion prediction is illustrated in FIG. 2, and is the mode that has been most typically used when the compression is applied to frames instead of to fields of video data. In this embodiment, fields one and two represent a single "prior" frame and fields three and four represent a single "current" frame. Since both fields of the current frame are compressed simultaneously, it is not possible to use field three to predict field four, as was done in the embodiment illustrated in FIG. 1. Therefore, in the FIG. 2 embodiment either field 1 or field 2 is used to form the prediction of both fields three and four. Thus, field three is predicted from field one as indicated by vector 20 or from field two as indicated by vector 22. Similarly, field four is predicted using either vector 24 from field one or vector 26 from field two.

Since the time interval between the prediction field and the current field is greater for vector 24 in the FIG. 2 embodiment than it was for vector 16 in the FIG. 1 embodiment, the prediction will be slightly less accurate. However, this can usually be compensated for by the increased effectiveness of frame mode compression over the strictly field mode compression scheme illustrated in FIG. 1.

Figure 3:
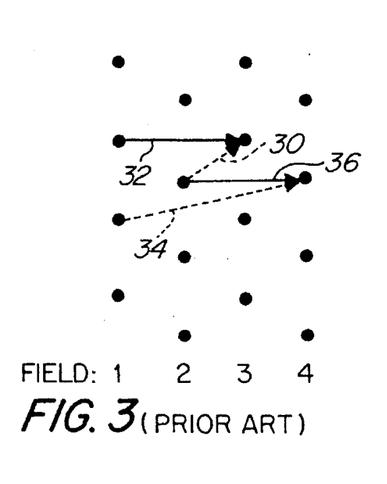
FIG. 3 is a diagrammatic illustration of a prior art frame mode motion prediction scheme.

An example of previously known frame mode motion compensation is illustrated in FIG. 3. In this embodiment, a single motion vector is used to predict both field three and field four from fields one and/or two. The motion vector that is selected is the one which minimizes the sum of the field three prediction error and the field four prediction error. One of two possibilities will occur depending on the motion vector that is selected. Either fields one and two, or fields two and one will predict fields three and four, respectively. In practice, the second possibility is less likely to occur, since the time interval between fields one and four is much longer than the time interval between fields two and three. Therefore, if the velocity of movement is constant, the motion vector used to predict field four should be proportionally larger than the one used to predict field three. This is one of the problems with existing frame mode motion compensation systems.

Figure 4:
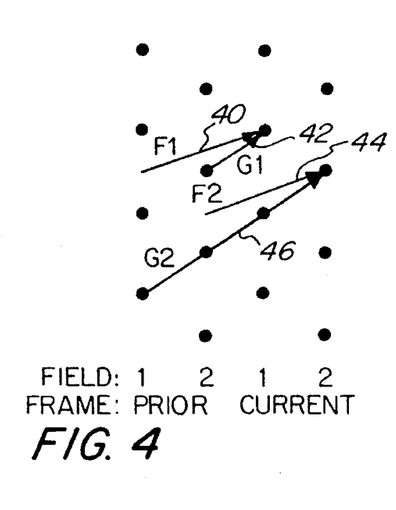
FIG. 4 is a diagrammatic illustration of a frame mode motion prediction scheme in accordance with the present invention.

The present invention overcomes the shortcomings of prior art motion compensation systems used for interlaced video, and applies to both frame mode and field mode processing. Frame mode motion compensation in accordance with the present invention is illustrated by FIG. 4. When using frame mode motion compensation, two motion vectors must be calculated. The first is the "same field" motion vector (F1 or F2) used to predict field one of a current frame from field one of a prior frame (F1) or to predict field two of the current frame from field two of the prior frame (F2). The other motion vector is referred to as an "opposite field" motion vector (G1 or G2) which is used to predict field one of the current frame from field two of the prior frame (G1) or to predict field two of the current frame from field one of the prior frame (G2).

In FIG. 4, it can be seen that motion vector 40 (F1) is the same as motion vector 44 (F2) and that motion vector 42 (G1) is the same as motion vector 46 (G2) except that G1 and G2 are both scaled in order to account for the difference in distance between the corresponding fields. More particularly, 2(G1)=2(G2)/3. Both the same field vector F1 or F2 and the opposite field vector G1 or G2 are calculated by minimizing the sum of the field one prediction error and the field two prediction error for the current frame. A decision is then made as to whether to use the same field vector (F1, F2), the opposite field vector (2G1, (2/3)G2), or both. If both the same field and opposite field vectors are used, then the same field and opposite field predictions made from the previous frame are averaged before differencing with the current frame. It is noted that it is the two predictions from the previous frame that are averaged, and not the vectors.

Two different field mode motion prediction schemes are used in accordance with the present invention. In the first, illustrated in FIG. 5, a frame structure is used wherein portions of odd and even field data (e.g., "a block pair" comprising a block of odd field data and a block of even field data) from the current frame are compared to similarly situated odd and even portions of the prior frame. This is referred to as field mode motion compensation using a frame structure. In the second scheme, individual odd portions and even portions of the current frame are compared to similarly situated portions in both the odd and even fields of the prior frame. This is referred to as field mode motion compensation using a field structure.

Figure 5:
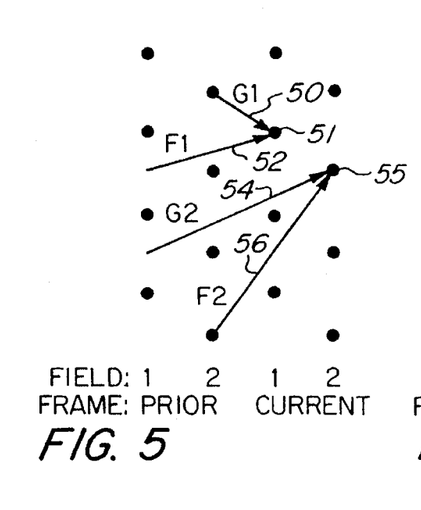
FIG. 5 is a diagrammatic illustration of a field mode motion prediction scheme using a frame structure in accordance with the present invention.

In field mode motion compensation, the same field and opposite field motion vectors are generated independently for field one and field two of the current frame. As shown in FIG. 5, vector 52 (F1) may differ from vector 56 (F2). Similarly, vector 50 (G1) may differ from vector 54 (G2). Decisions as to whether to use same field or opposite field vectors are determined independently for the two fields. In other words, the prediction for field one is obtained using either F1, G1, or by averaging the predictions associated with both the F1 and G1 vectors. Similarly, the prediction for field two is obtained using either F2, G2 or an average of the predictions associated with both of the F2 and G2 vectors.

By way of example, the prediction for a portion 51 of field one of the current frame illustrated in FIG. 5 can be obtained by comparing the video data contained in portion 51 with similarly situated video data in field one of the prior frame (as indicated by motion vector 52) or by comparing the video data for portion 51 of field one of the current frame to similarly situated data in field two of the prior frame (as indicated by motion vector 50). Alternatively, the best prediction may result by comparing the video data for portion 51 of the current frame to an average of the video data forming the best individual predictions in each of field one and field two of the prior frame. In this instance, the video data in prior frame field one corresponding to motion vector 52 is averaged with the video data in prior frame field two corresponding to motion vector 50. The average of this data is compared to the video data contained in portion 51 of the current frame. A decision is then made as to whether the prediction error (i.e., the difference between portion 51 and the F1, G1, or averaged F1/G1 data from the prior frame) is minimized by using the F1, G1 or F1/G1 options. Selection of the prediction error signal can be made based on the one that provides the least mean square error or the minimum absolute error.

Figure 6:
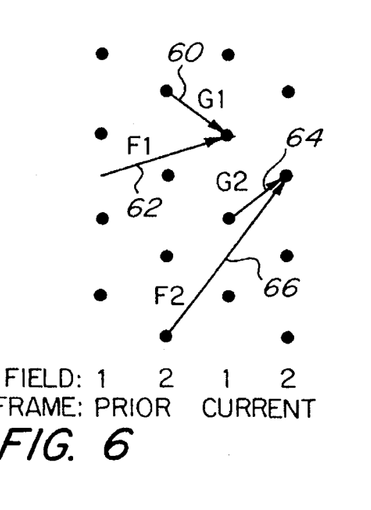
FIG. 6 is a diagrammatic illustration of a field mode motion prediction scheme in accordance with the present invention that uses a field structure instead of a frame structure.

In the field mode, field structure implementation illustrated in FIG. 6, the images are not structured as frames. In this instance, motion vector 64 (G2) can denote the vector used to predict field two of the current frame from field one of the current frame. The remaining vectors in the embodiment of FIG. 6 are identical to those for the embodiment of FIG. 5. Specifically, vector 60 (G1) is the same as vector 50, vector 62 (F1) is the same as vector 52, and vector 66 (F2) is the same as vector 56.

Figure 7:
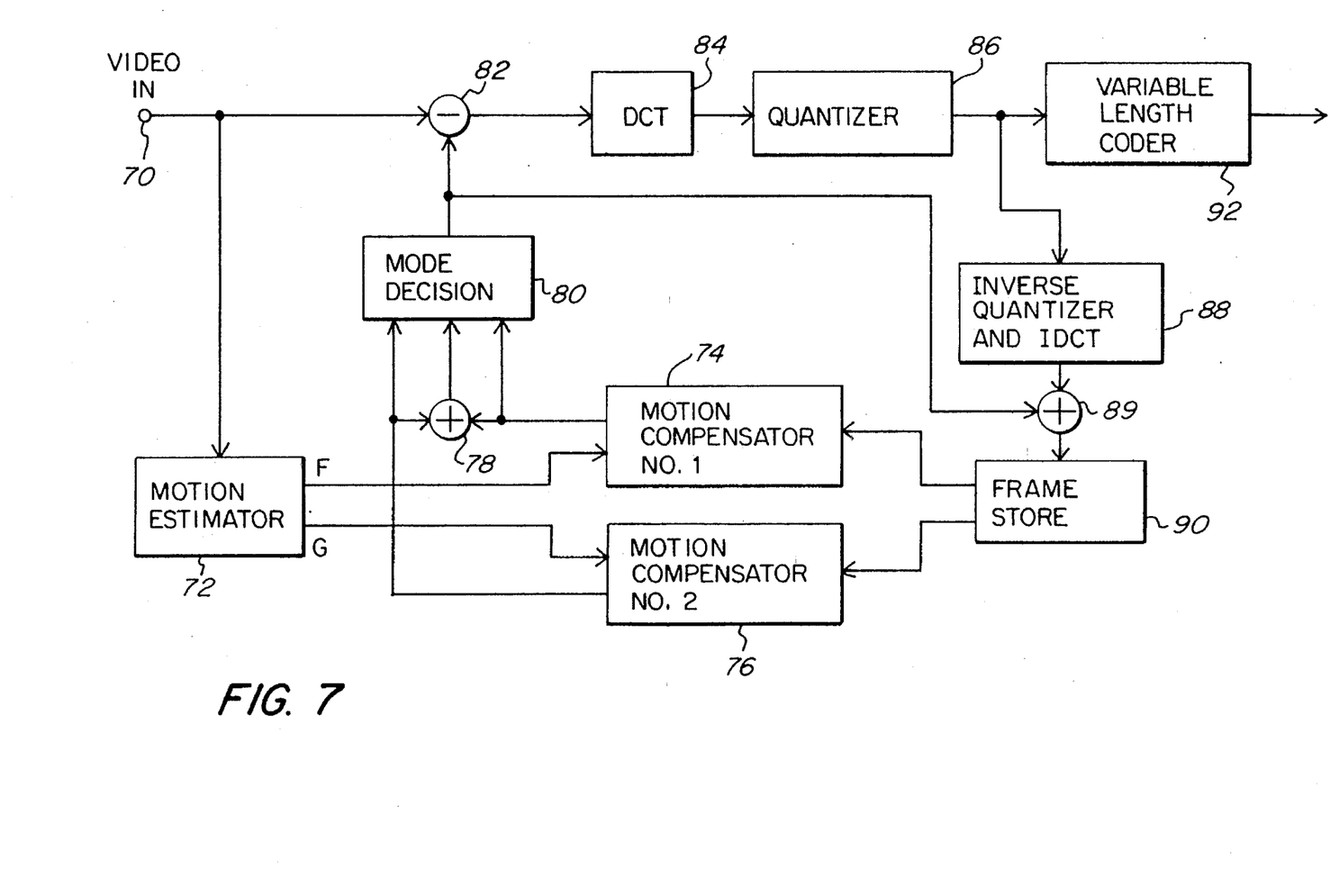
FIG. 7 is a block diagram of encoder apparatus in accordance with the present invention.

Referring now to FIG. 7, a block diagram is provided of an encoder for implementing the present invention. Video data to be encoded is input to a terminal 70. Typically, the video data will be processed in a block format. Each block is differenced in a subtractor 82 with a prediction for that block output from a mode decision circuit 80. The difference is referred to as a prediction error signal, and is compressed using a suitable algorithm such the discrete cosine transform (DCT) algorithm illustrated at 84. The transform coefficients are quantized by a quantizer 86 and input to a variable length coder 92 for further compression. The variable length coder can comprise, for example, a well known Huffman coder.

In order to obtain a prediction for each current video block input at terminal 70, the blocks are compared in a motion estimator 72 to similarly situated data in a prior video frame or in a prior field of the same video frame where field mode, field structure processing is provided. Motion estimator 72 outputs a same field motion vector F and an opposite field motion vector G to motion compensators 74, 76, respectively.

Motion compensator 74 will retrieve a portion of video data from a prior video field stored in frame store 90 in response to the F motion vector output from motion estimator 72. Similarly, motion compensator 76 will retrieve data from a prior opposite field stored in frame store 90 in response to the G motion vector. Frame store 90 receives the prior video data from an adder 89, which combines the prior frame prediction with the reconstructed prediction error signal that has been inverse quantized and inverse discrete cosine transformed (IDCT) by circuits 88. A mode decision circuit 80 is coupled to receive the prediction data from motion compensator 74 and motion compensator 76 and to receive the sum thereof from adder 78. Circuitry 80 determines whether the prediction from motion compensator 74, the prediction from motion compensator 76 or an average of the two will result in the best overall prediction for the current video data block. The decision is based on which choice will result in the minimum data (including any necessary overhead such as field/frame mode identification and same field and/or opposite field identification) that must be transmitted for the block.

Figure 8:
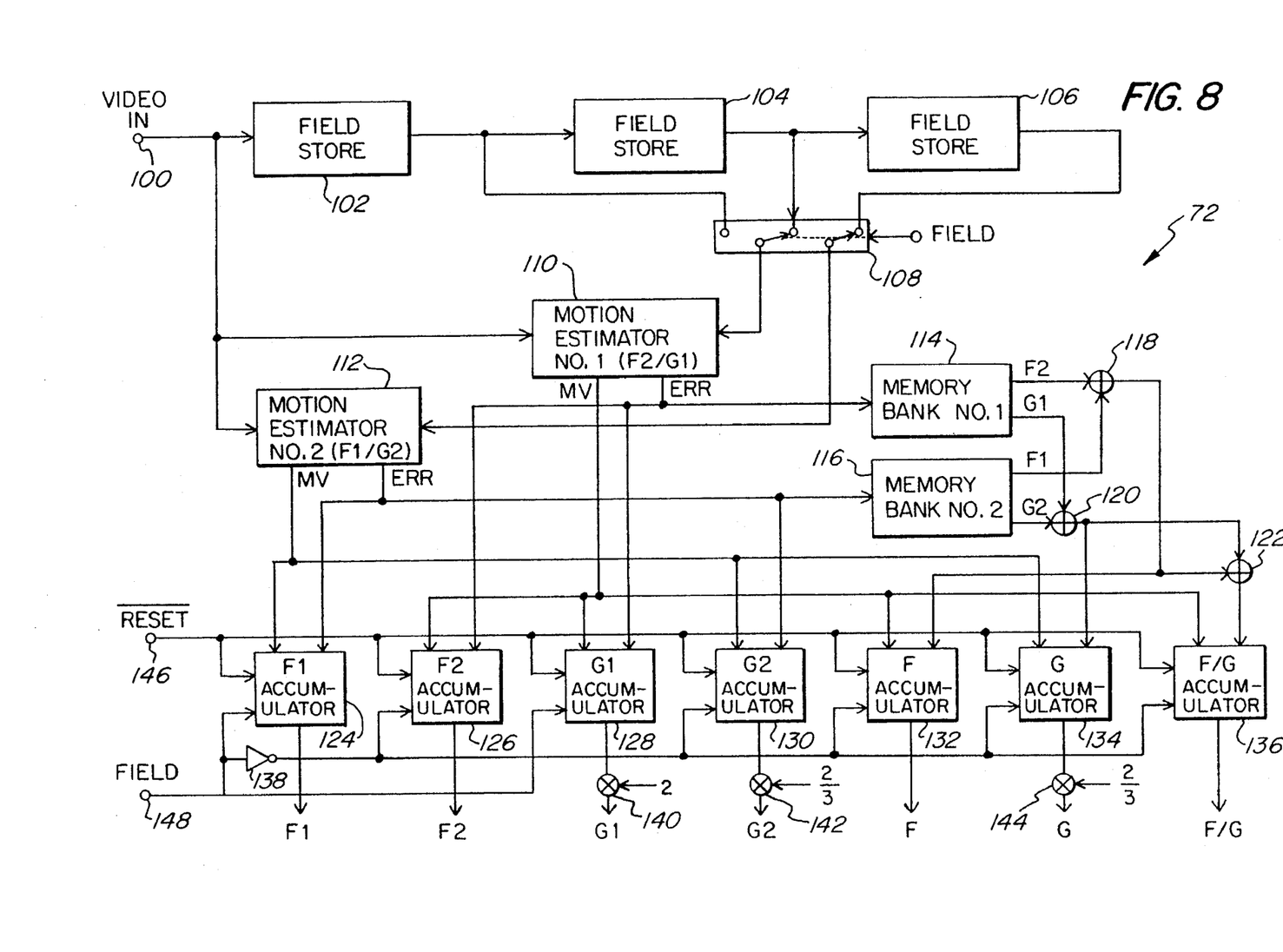
FIG. 8 is a detailed block diagram of the motion estimator portion of the encoder of FIG. 7.

Motion estimator 72 is illustrated in greater detail in FIG. 8. A motion estimator calculates the F1, F2, G1 and G2 motion vectors illustrated in FIG. 5 and the F and G vectors illustrated in FIG. 4, wherein F=F1=F2 and G=2G1=(2/3)G2. The motion estimator also calculates an additional vector F/G which is the best single vector given the constraint F=G.

The decision concerning the use of field mode or frame mode, and same field and/or opposite field can be made by minimizing the prediction error or by using smarter aposteori decision techniques. Although the number of motion vectors that are transmitted can vary from one to four, a total of six motion vectors are calculated by the motion estimator of FIG. 8. Two of the motion vectors (F, G) relate to frame mode and four (F1, F2, G1, G2) relate to field mode. It is noted, however, that all motion vectors are calculated from field pairs and therefore require only half as many computations to cover the same search range as a motion vector derived from a frame pair. Therefore, the two frame motion vectors can be calculated using the same number of computations as required for a conventional motion vector. Further, since the search range corresponding to each of the four field vectors is limited to a single field, the total number of computations to estimate all four field vectors is the same as the number required for a single conventional motion vector. It is noted that the present invention adds some additional complexity for estimating the opposite field motion vector in the frame mode of operation, since the prediction error due to the scaled G1 vector must be summed with the prediction error corresponding to the scaled G2 vector. As a practical matter, this additional complexity can be eliminated by implementing the estimator in a custom integrated circuit chip.

Subpixel accuracy is achieved for both frame and field motion vectors by interpolation within the field and not within the frame. One technique for providing interpolation is disclosed in commonly assigned, copending U.S. patent application Ser. No. 08/009,831 to Liu, et al. filed on Jan. 27, 1993. In the present invention, it is not necessary to interpolate between adjacent lines within a frame since the same effect is achieved by averaging the predictions from both of the two fields in the frame.

The motion estimator of FIG. 8 illustrates three field stores 102, 104, and 106. These field stores receive video data input at terminal 100 and delay the input video by one field each. Thus, three consecutive fields of data are stored in the estimator. A first motion estimator 110 and second motion estimator 112 calculate block displacement errors corresponding to all possible displacements within a predetermined search range. These motion estimators are of conventional design, and well known in the art of motion compensation. The motion estimators receive prior video data from the field stores 102, 104 and 106 via a switch 108. Motion estimator 110 receives data delayed by one field from field store 102 or data delayed by two fields from field store 104. Motion estimator 112 receives data delayed by two fields from field store 104 or data delayed by three fields from field store 106. Switch 108 is responsive to a signal "FIELD" which designates whether the prediction is to be applied to field one or field two of the previous frame. The signal is toggled after each new field is received. The motion estimators compare the current frame portion to a search area in the prior frame and find the best match based on predefined criteria. The motion estimators output the prediction error signal for the best match as well as the motion vector that identifies the location of the best matched data in the prior frame.

The prediction error signals ("ERR") output from the motion estimators are input to respective memory banks 114, 116. These memory banks are used to store the G1, F2 and F1, G2 prediction errors, respectively, for subsequent averaging of the F1 and F2 errors in adder 118 and averaging of the G1 and G2 errors in adder 120. The averaged values are used to provide the F and G motion vectors via accumulators described in greater detail below. The two averages are also averaged together in an adder 122 for use in providing an F/G motion vector.

A bank of seven accumulators 124, 126, 128, 130, 132, 134 and 136 is provided for saving the respective F1, F2, G1, G2, F, G and F/G motion vectors with the least error. Field mode accumulators 124 and 130 receive motion vector and error data from motion estimator 112. Field mode accumulators 126, 128 receive motion vector and error data from motion estimator 110. Frame mode accumulator 132 receives motion vector information from motion estimator 110 and error information from adder 118. Frame mode accumulator 134 receives motion vector information from motion estimator 112 and error information from adder 120. F/G accumulator 136 receives motion vector information from motion estimator 110 (or, alternatively from motion estimator 112 since F=G for the F/G mode) and error information from adder 122.

The output of each accumulator is updated with a new input motion vector only if the corresponding displacement error is less than the error corresponding to the previous motion vector stored in the accumulator. The F1 and G1 accumulators are only allowed to update during the first field of each frame (field=0) and all other accumulators are only allowed to update during the second field of each frame (field=1). This updating constraint is controlled by inputting the field signal via terminal 148 directly to accumulators 124 and 128. The field signal is inverted by an inverter 138 before being input to the remaining accumulators. The accumulators are reset via terminal 146 for each new portion (e.g., block) of the input video data that is processed. The reset forces the accumulator to be updated with the first motion vector candidate for the new portion being processed.

As noted above, the G1, G2 and G motion vectors are scaled. A scaling factor of two is input to a multiplier 140 for the G1 vector. A scaling factor of 2/3 is applied via a multiplier 142 for the G2 vector. A scaling factor of 2/3 is also applied to the G vector via multiplier 144.

Since frame mode motion estimation requires that the errors corresponding to the F1 and F2 motion vectors and the G1 and G2 motion vectors be summed, memory banks 114 and 116 are required. Since F1 and G1 are only computed during field 1 (field=0) and F2 and G2 are only computed during field 2 (field=1), it is necessary to store the errors corresponding to all possible displacements for each block of one field. Note that it is possible to eliminate the memory banks if two more motion estimators are introduced to calculate F2 and G2 concurrently with F1 and G1. However, some memory will still be required to match a scaled G vector with each F vector. In this case, the amount of memory required will depend on the motion vector range.

Figure 9:
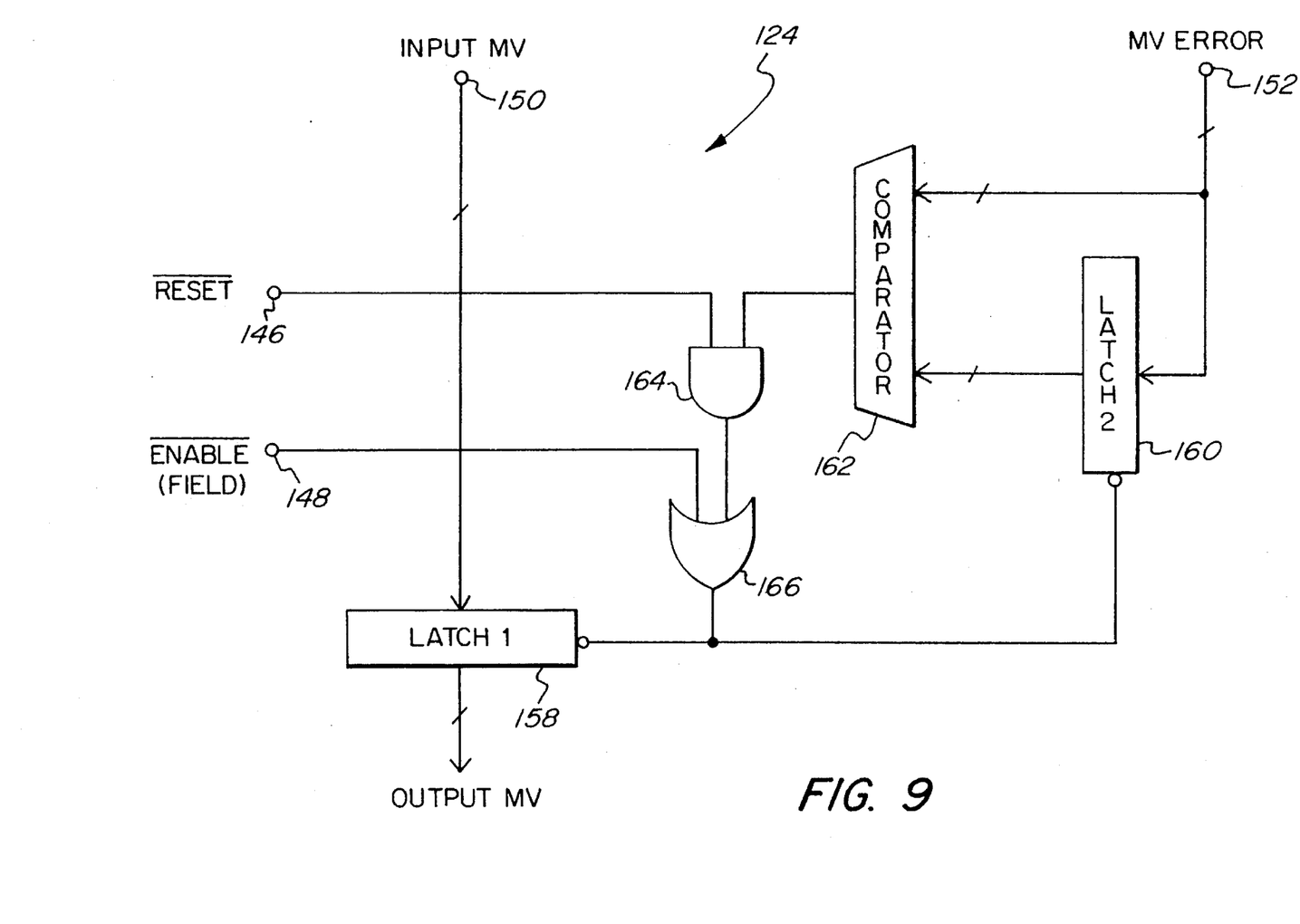
FIG. 9 is a schematic diagram of the accumulators used in the motion estimator of FIG. 8.

An implementation of accumulator 124 is illustrated in FIG. 9. Each of the other accumulators can have an identical configuration. The motion vectors are input to the accumulator via a terminal 150. Prediction errors associated with the motion vectors are input via terminal 152. Upon receipt of a reset signal at terminal 146, AND gate 164 and OR gate 166 will cause the first latch 158 to latch the first motion vector for the next portion of video data to be processed. At the same time, the error associated with that motion vector will be latched in a second latch 160. As the associated motion estimator (e.g., motion estimator 112) searches an area of the prior video frame for a match to the portion of video data currently being processed, new motion vectors and errors associated therewith will be input to the accumulator via terminals 150, 152 respectively. The new errors are compared in a comparator 162 with the previous error latched in latch 160. When the comparator 162 determines that a newly received error is better than a previously latched error, it will cause latch 158 to store the motion vector associated with that error and latch 160 to store the error itself. In this manner, the accumulator will obtain the best prediction error and associated motion vector for each new portion of video data processed.

All motion vectors are represented in terms of their magnitude when adjusted for a distance of one frame (i.e., two fields). Therefore, the same field vectors (F1 and F2) never require scaling. On the other hand, the opposite field vectors (G1 and G2) correspond to frame distances of 1/2 and 3/2 respectively. Therefore, the vector that is transmitted would be twice as large in the case of G1 and two thirds as large in the case of G2. When frame mode is used, G1 and G2 will be identical when represented with a frame distance of one. Each vector is represented with half pixel precision prior to scaling, when frame distance is one. After scaling, the vectors are again rounded to the nearest half pixel.

One advantage of this representation is that it simplifies the prediction of motion vectors. Since the motion vector distance is now fixed in all cases, only one motion vector needs to be stored so that it can be used for prediction of the next motion vector.

As an example, suppose the motion vectors set forth in FIG. 4 are to be transmitted. These vectors are first compressed in order to minimize the overhead required to send them. It is always desirable to send motion vectors as differences, since the resulting zero-mean distribution is more easily compressed. Therefore, the first step is to send the difference between F1 and the last motion vector that was encoded. Next, the difference between 2G1 (which is the same as (2/3)G2) and F1 is transmitted. F2 does not need to be sent since it is the same as F1. When the next motion vector is to be encoded, it is first differenced with 2G1.

Now suppose the motion vectors in FIG. 5 are to be transmitted. The first step will be to send the difference between F1 and the last motion vector that was encoded. Next, the difference between 2G1 and F1 is sent. After that, the difference between F2 and 2G1 is sent, followed by the difference between (2/3)G2 and F2. The next motion vector will be differenced with (2/3)G2. Motion vectors that are not selected for transmission are simply omitted without changing the transmission order of the vectors which remain.

Figure 10:
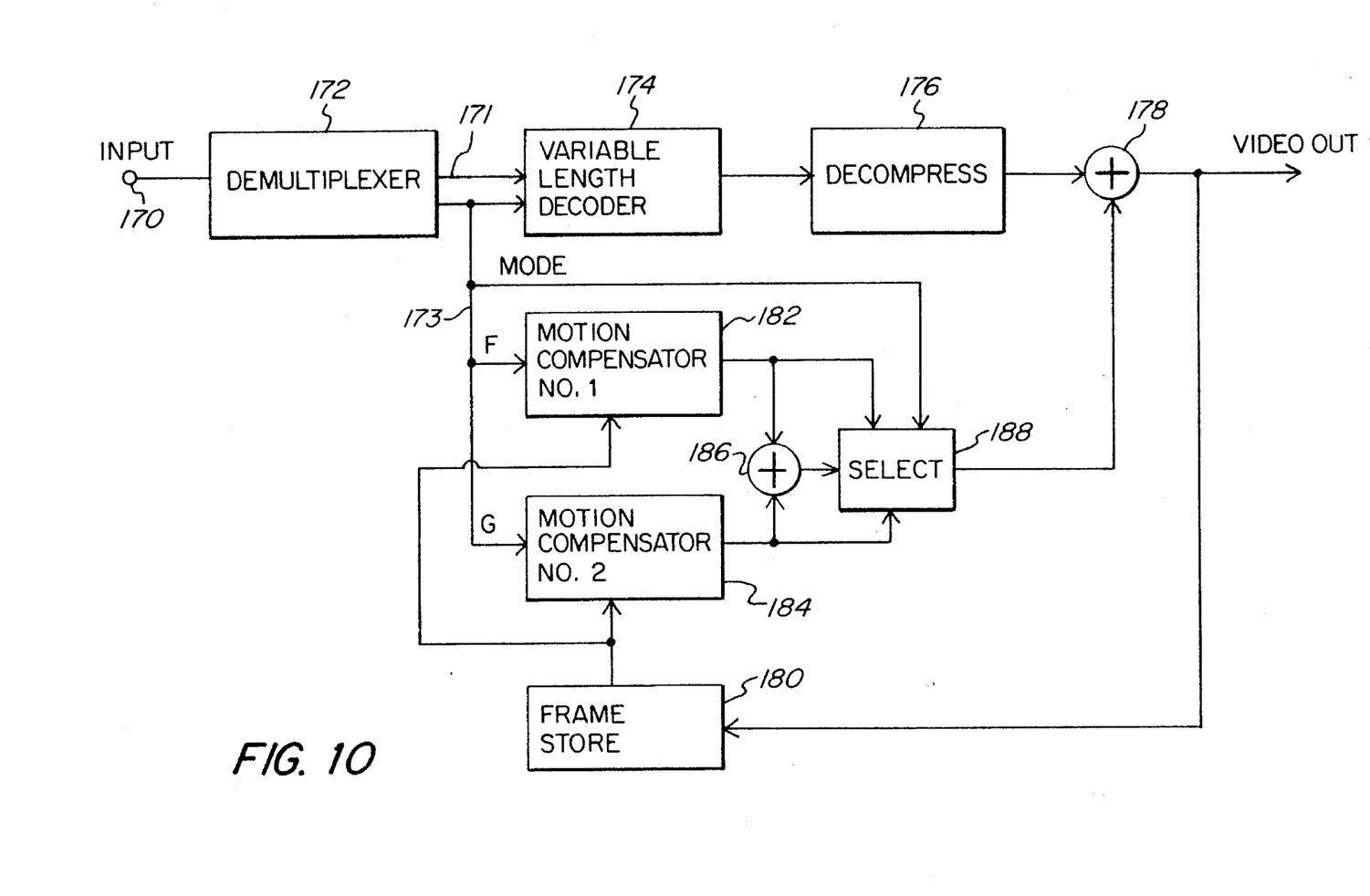
FIG. 10 is a block diagram of a decoder in accordance with the present invention.

FIG. 10 illustrates a decoder that can be used in accordance with the present invention. Transmitted video data and overhead is received at an input terminal 170 and demultiplexed by a demultiplexer 172. The demultiplexer outputs the variably length encoded video data via line 171. The overhead data, which includes motion vectors and mode selection information is output via line 173.

The variable length encoded video data is decoded by a variable length decoder 174 and decompressed in decompression circuit 176 which can comprise, for example, an inverse quantizer and an IDCT circuit similar to circuits 88 at the encoder of FIG. 7. The decompressed, variable length decoded prediction errors are coupled to one input of an adder 178 which is used to reconstruct the original video data. The other input of adder 178 comprises the predictions recovered using the previously reconstructed prior frame data. A first motion compensator 182 receives the F motion vectors from line 173 and a second motion compensator 184 receives the G motion vectors from line 173. These motion compensators are similar to motion compensators 74, 76 respectively of the encoder of FIG. 7. The motion compensators receive previous frame data from a frame store 180, that is coupled to receive the previous frames from the output of adder 178.

The outputs of motion compensators 182 and 184 are input to a selector 188 and to an adder 186. Adder 186 provides the average of the prediction data output from the motion compensators to selector 188. Selector 188 is responsive to mode selection data received via lines 173 for selecting either the prediction output for motion compensator 182, the prediction output for motion compensator 184, or the average of the two predictions output from adder 186. The selected prediction is used by adder 178 to reconstruct the original video data for output.

It should now be appreciated that the present invention provides methods and apparatus for encoding and decoding motion compensated interlaced video data. The best same field vector F and the best opposite field vector G are independently selected. The prediction error resulting from the use of both the F and G vectors (with the two predictions averaged) is compared with the prediction error resulting from the use of F or G alone. The vector(s) which results in the least error is then selected. This differs from prior art systems, in which only one vector (i.e., either the same field or opposite field vector) was generated.

When performing frame mode estimation, the present invention finds the G vector that minimizes the sum of the first and second field errors when scaling is applied to both G1 and G2. Similarly, the best signal vector F/G (where F=G) is found while accounting for the scaling of G1 and G2. In the motion estimator implementation of FIG. 8, all motion vectors are calculated without increasing the required number of motion estimators over prior art implementations.

The present invention further provides motion vector prediction in which all motion vectors are scaled to correspond to a common time interval, such as one frame time, before the motion vector differences are calculated. As a result, only one motion vector needs to be stored. The F2 or G2 motion vectors are advantageously differentially encoded with the F1 or G1 vectors.

Although the invention has been described in connection with various specific embodiments, those skilled in the art will appreciate that numerous adaptations and modifications may be made thereto without departing from the spirit and scope of the invention as set forth in the claims.

I claim:

1. A method for motion compensated coding of digital video signals defining successive frames of interlaced video data including a current frame with even and odd fields of pixel data, and a prior frame with even and odd fields of pixel data, said method comprising the steps of:

(a) comparing portions of pixel data from said current frame even field to similarly situated portions in said prior frame even field to determine a first prediction error signal (PES) indicative of the difference therebetween, and a corresponding motion vector $F1_U$;

(b) comparing portions of pixel data from said current frame even field to similarly situated portions in said prior frame odd field to determine a second PES indicative of the difference therebetween, and a corresponding motion vector $G1_U$;

(c) comparing portions of pixel data from said current frame odd field to similarly situated portions in said prior frame even field to determine a third PES indicative of the difference therebetween, and a corresponding motion vector $G2_U$, said vectors $G1_U$ and $G2_U$ being unidirectional with a vector G;

(d) comparing portions of pixel data from said current frame odd field to similarly situated portions in said prior frame odd field to determine a fourth PES indicative of the difference therebetween, and a corresponding motion vector $F2_U$, said vectors $F1_U$ and $F2_U$ being unidirectional with a vector F; and (e) selecting at least one of said first, second, third and fourth PESs for use in representing a corresponding current frame portion with a minimized error.

2. The method in accordance with claim 1, wherein said motion vectors $F1_U$ and $F2_U$ are the same as said vector F, and said motion vectors $G1_U$ and $G2_U$ are related to said vector G such that $G=2\cdot G1_U=(2/3)G2_U$.

3. The method in accordance with claim 1, comprising the further step of selecting one of:

(i) said first and fourth PESs;
    (ii) said second and third PESs;
    (iii) an average of said first and second PESs; and
    (iv) an average of said third and fourth PESs; to represent a corresponding current frame portion with a minimized error.

4. A method in accordance with claim 1, comprising the further step of:

providing specific ones of said motion vectors according to said selecting steps, thereby enabling reproduction of a corresponding current frame portion by a decoder.

5. The method in accordance with claim 1, wherein said selecting step minimizes at least one of:

(i) the amount of data necessary for transmission to enable a decoder to reproduce the current frame; and
    (ii) the amount of data contained in a selected PES.

6. The method in accordance with claim 3, comprising the further step of providing:

(i) said vector F when said first and fourth PESs are selected;
    (ii) said vector G when said second and third PESs are selected;
    (iii) an average of said vectors $F1_U$ and $G1_U$ when said average of said first and second PESs is selected; and
    (iv) an average of said vectors $G2_U$ and $F2_U$ when said average of said third and fourth PESs is selected; to enable reproduction of a corresponding current frame portion by a decoder.

7. A method in accordance with claim 1, comprising the further step of encoding said selected PESs with data indicative of locations in said prior frame which are associated with said corresponding motion vectors.

8. A method in accordance with claim 1, wherein said current frame even and odd field pixel data portions comprise pairs of even and odd blocks of pixel data.

9. A method in accordance with claim 1, wherein said vectors $F1_U$ and $F2_U$, and $G1_U$ and $G2_U$, respectively, are found by selecting the PESs, which when summed, provide the smallest magnitude, and then finding the vectors for the selected PESs.

10. A method in accordance with claim 1, wherein said vectors F and G are the same vector.

11. A method in accordance with claim 5, wherein the encoded data comprises field identifier information and specific ones of said motion vectors according to said selecting steps.

12. A method in accordance with claim 1 comprising the further steps of:
- (f) comparing portions of pixel data from said current frame even field to similarly situated portions in said prior frame even field to determine a fifth prediction error signal (PES) indicative of the difference therebetween, and a corresponding motion vector F1;
- (g) comparing portions of pixel data from said current frame odd field to similarly situated portions in said prior frame odd field to determine a sixth PES indicative of the difference therebetween, and a corresponding motion vector F2;
- (h) comparing portions of pixel data from said current frame even field to similarly situated portions in said prior frame odd field to determine a seventh PES indicative of the difference therebetween, and a corresponding motion vector G1;
- (j) comparing portions of pixel data from said current frame odd field to similarly situated portions in one of said:
  - (i) prior frame even field; and
  - (ii) current frame even field; to determine an eighth PES indicative of the difference therebetween, and a corresponding motion vector G2; and
- (k) selecting at least one of said PESs for use in representing a corresponding current frame portion with a minimized error.

13. The method in accordance with claim 12, wherein said selecting step minimizes at least one of:
- (i) the amount of data necessary for transmission to enable a decoder to reproduce the current frame; and
- (ii) the amount of data contained in a selected PES.

14. The method in accordance with claim 12, wherein said motion vectors $F1_U$ and $F2_U$ are the same as said vector $F_U$, and said motion vectors $G1_U$ and $G2_U$ are related to said vector $G_U$ such that $G_U = 2 \cdot G1_U = (2/3)G2_U$.

15. The method in accordance with claim 12, comprising the further steps of selecting one of a frame mode and a field mode to represent the current frame, wherein:
- (1) if said frame mode is selected, selecting one of:
  - (i) said first and fourth PESs;
  - (ii) said second and third PESs;
  - (iii) an average of said first and second PESs; and
  - (iv) an average of said third and fourth PESs; to represent a corresponding current frame portion with a minimized error; and
- (m) if said field mode is selected:
  - (i) selecting one of said fifth, seventh, and an average of said fifth and seventh PESs to represent a corresponding current frame even field portion with a minimized error; and
  - (ii) selecting one of said sixth, eighth, and an average of said sixth and eighth PESs to represent a corresponding current frame odd field portion with a minimized error.

16. A method in accordance with claim 12, comprising the further step of:
providing specific ones of said motion vectors according to said selecting steps, thereby enabling reproduction of a corresponding current frame portion by a decoder.

17. A method in accordance with claim 12, wherein said vectors $F1_U$ and $F2_U$, and $G1_U$ and $G2_U$, respectively, are found by selecting the PESs, which when summed, provide the smallest magnitude, and then finding the vectors for the selected PESs.

18. A method in accordance with claim 12, wherein said current frame even and odd field pixel data portions of said steps (a), (b), (c) and (d) comprise pairs of even and odd blocks of pixel data.

19. A method in accordance with claim 12, wherein said current frame even and odd field pixel data portions of said steps (f), (g), (h) and said step (j), subpart (i) comprise pairs of even and odd blocks of pixel data.

20. A method in accordance with claim 12, wherein said current frame even and odd field pixel data portions of said steps (a), (b), (c), (d), (f), (g), (h) and said step (j), subpart (i) comprise pairs of even and odd blocks of pixel data.

21. A method for motion compensated coding of digital video signals defining successive frames of interlaced video data including a current frame with even and odd fields of pixel data, and a prior frame with even and odd fields of pixel data, said method comprising the steps of:
- (a) comparing portions of pixel data from said current frame even field to similarly situated portions in said prior frame even field to determine a first prediction error signal (PES) indicative of the difference therebetween, and a corresponding motion vector F1;
- (b) comparing portions of pixel data from said current frame even field to similarly situated portions in said prior frame odd field to determine a second PES indicative of the difference therebetween, and a corresponding motion vector G1;
- (c) comparing portions of pixel data from said current frame odd field to similarly situated portions in said current frame even field to determine a third PES indicative of the difference therebetween, and a corresponding motion vector G2;
- (d) comparing portions of pixel data from said current frame odd field to similarly situated portions in said prior frame odd field to determine a fourth PES indicative of the difference therebetween, and a corresponding motion vector F2;
- (e) selecting a preferred even PES from one of said first and second PESs for use in representing a corresponding current frame even field portion; and
- (f) selecting a preferred odd PES from one of said third and fourth PESs for use in representing a corresponding current frame odd field portion.

22. The method in accordance with claim 21 wherein said vectors F1 and F2 are unidirectional.

23. The method in accordance with claim 21, comprising the further steps of:
- (a) selecting one of:
  - (i) said first PES;
  - (ii) said second PES; and
  - (iii) an average of said first and second PESs to represent said current frame even field portion; and
- (b) selecting one of:
  - (i) said third PES;
  - (ii) said fourth PES; and
  - (iii) an average of said third and fourth PESs to represent said current frame odd field portion.

24. A method in accordance with claim 21, comprising the further step of:
providing specific ones of said motion vectors according to said selecting steps, thereby enabling reproduction of a corresponding current frame portion by a decoder.

25. The method in accordance with claim 21, wherein said selecting step minimizes at least one of:
- (i) the amount of data necessary for transmission to enable a decoder to reproduce the current frame; and (ii) the amount of data contained in a selected PES.

26. A method for motion compensated coding of digital video signals defining successive frames of interlaced video data including a current frame with even and odd fields of pixel data, and a prior frame with even and odd fields of pixel data, said method comprising the steps of:

(a) comparing portions of current frame even field pixel data to similarly situated prior frame even field pixel data to determine a first prediction error signal (PES) indicative of the differences therebetween, and a corresponding motion vector F1;

(b) comparing portions of current frame odd field pixel data to similarly situated prior frame odd field pixel data to determine a second PES indicative of the differences therebetween, and a corresponding motion vector F2;

(c) comparing portions of current frame even field pixel data to similarly situated prior frame odd field pixel data to determine a third PES indicative of the differences therebetween, and a corresponding motion vector G1;

(d) comparing portions of current frame odd field pixel data to similarly situated prior frame even field pixel data to determine a fourth PES indicative of the differences therebetween, and a corresponding motion vector $G2_A$;

(e) comparing portions of current frame odd field pixel data to similarly situated current frame even field pixel data to determine a fifth PES indicative of the differences therebetween, and a corresponding motion vector $G2_B$;

(f) selecting a preferred even PES from one of said first and third PESs for use in representing a corresponding portion of a current frame even field; and (g) selecting a preferred odd PES from one of said second, fourth and fifth PESs for use in representing a corresponding portion of a current frame odd field.

27. The method in accordance with claim 26, comprising the further steps of:

(a) selecting one of:
(i) said first PES;
(ii) said third PES; and
(iii) an average of said first and third PESs;
to represent said corresponding current frame even field portion; and (b) selecting one of:
(i) said second PES;
(ii) said fourth PES;
(iii) said fifth PES;
(iv) an average of said second and fourth PESs;
(v) an average of said second and fifth PESs;
(vi) an average of said fourth and fifth PESs;
(vii) an average of said second, fourth and fifth PESs;
to represent said corresponding current frame odd field portion.

28. A method in accordance with claim 26, comprising the further step of:

providing specific ones of said motion vectors according to said selecting steps, thereby enabling reproduction of a corresponding current frame portion by a decoder.

29. The method in accordance with claim 26, wherein said selecting step minimizes at least one of:

(i) the amount of data necessary for transmission to enable a decoder to reproduce the current frame; and (ii) the amount of data contained in a selected PES.

30. A method in accordance with claim 26, wherein said current frame even and odd field pixel data portions of said steps (a), (b), (c) and (d) comprise pairs of even and odd blocks of pixel data.

31. Encoder apparatus for motion compensated coding of digital video signals defining successive frames of interlaced video data including current and prior frames with both even and odd fields of pixel data, said apparatus comprising:

(a) means for subdividing said current and prior frames into portions of pixel data;

(b) means for storing pixel data from successive fields for use in comparing portions of pixel data from said current frame even field to similarly situated portions in said prior frame even and odd fields, and for comparing portions of pixel data from said current frame odd field to similarly situated portions in at least one of:
(i) said prior frame even and odd fields; and
(ii) said prior frame even and odd fields and said current frame even field; and
(iii) said current frame even field; to determine corresponding prediction error signals (PESs) indicative of the differences therebetween, and corresponding motion vectors; and (c) means for selecting particular ones of said PESs for use in representing corresponding current frame even and odd field portions.

32. The apparatus in accordance with claim 31, wherein a first set of unidirectional motion vectors corresponds to selected same-field PESs, and a second set of unidirectional motion vectors correspond to selected opposite-field PESs.

33. The apparatus in accordance with claim 31, further comprising:

(a) means for averaging selected ones of said PESs to obtain averaged even and odd field PESs;

(b) means for selecting particular ones of said averaged and unaveraged PESs to represent said current frame even and odd field portions.

34. The apparatus in accordance with claim 31, further comprising:

means for providing specific ones of said motion vectors according to said selecting steps, thereby enabling reproduction of a current frame portion by a decoder.

35. The apparatus in accordance with claim 31, further comprising:

means for scaling selected ones of said motion vectors associated with said opposite field PESs to account for temporal differences resulting from the use of an opposite field comparison instead of a same field comparison.

36. Decoder apparatus for motion compensated interlaced digital video signals which operates in at least one of a plurality of operating modes, said apparatus comprising:

(a) memory means for storing odd and even field pixel data for a first video frame;

(b) means for receiving motion compensated pixel data from odd and even field portions of a second video frame together with motion vector and motion compensation mode information for said portions, said motion vector information identifying pixel data in said first video frame such that said second video frame can be reconstructed using said received motion compensated pixel data;

(c) motion compensator means responsive to received motion vector information for retrieving pixel data from designated fields of said first video frame; and (d) means responsive to said motion compensation mode information for combining said received motion compensated pixel data from said second frame with said retrieved pixel data from said first frame in order to reconstruct said second frame; wherein:
  (i) in a first of said operating modes, both even and odd field pixel data from said first frame is used to reconstruct the second frame even and odd fields based on same-field motion vectors that are unidirectional;
  (ii) in a second of said operating modes, both even and odd field pixel data from said first frame are used to reconstruct the second frame even and odd fields based on same-field motion vectors that are not unidirectional; and
  (iii) in a third of said operating modes, first frame even and odd field pixel data is used to reconstruct the second frame even field, and subsequently, the first frame even and odd field pixel data and second frame even field pixel data are used to reconstruct the second frame odd field.

37. Decoder apparatus for motion compensated interlaced digital video signals defining successive frames of video data including a current frame with even and odd fields of pixel data, and a prior frame with even and odd fields of pixel data, said apparatus comprising:

means for receiving a first motion vector F for use in reconstructing corresponding portions of current frame even and odd fields of pixel data from prior frame same-field pixel data;

means for receiving a second motion vector G for use in reconstructing corresponding portions of current frame even and odd fields of pixel data from prior frame opposite-field pixel data;

wherein said vector G is scaled as required to account for temporal differences resulting from the use of opposite field data instead of same field data.

38. The apparatus of claim 37, wherein said vectors F and G are unidirectional.

39. Decoder apparatus for motion compensated interlaced digital video signals defining successive frames of video data including a current frame with even and odd fields of pixel data, and a prior frame with even and odd fields of pixel data, said apparatus comprising:

means for receiving a motion vector for use in reconstructing corresponding portions of current frame even and odd fields of pixel data from prior frame same-field and opposite field pixel data;

wherein said vector is scaled as required to account for temporal differences resulting from the use of opposite field data instead of same field data.

* * * * *